United States Patent [19]

Fukumoto et al.

[11] Patent Number: 4,766,585
[45] Date of Patent: Aug. 23, 1988

[54] TRACKING ERROR DETECTING APPARATUS FOR OPTICAL HEAD

[75] Inventors: Atsushi Fukumoto; Kiyoshi Ohsato; Michio Oka, all of Shinagawa, Japan

[73] Assignee: Sony Corporation, Tokyo, Japan

[21] Appl. No.: 844,178

[22] PCT Filed: Jul. 11, 1985

[86] PCT No.: PCT/JP85/00391
   § 371 Date: Mar. 12, 1986
   § 102(e) Date: Mar. 12, 1986

[87] PCT Pub. No.: WO86/00742
   PCT Pub. Date: Jan. 30, 1986

[30] Foreign Application Priority Data

Jul. 13, 1984 [JP] Japan .................. 59-145768

[51] Int. Cl.⁴ .................................. G11B 7/125
[52] U.S. Cl. ......................... 369/46; 369/112; 369/118; 369/122
[58] Field of Search .......... 369/44, 45, 46, 109, 369/110, 112, 118, 122, 121; 250/201; 350/162.11, 448

[56] References Cited

U.S. PATENT DOCUMENTS

| 4,160,269 | 7/1979 | Kramer | 369/118 |
| 4,337,535 | 6/1982 | Van Megan et al. | 369/121 |
| 4,349,901 | 9/1982 | Howe | 369/45 |
| 4,460,990 | 7/1984 | Opheij | 369/112 |
| 4,462,095 | 7/1984 | Chen | 369/44 |
| 4,507,772 | 3/1985 | Yamamoto | 369/109 |

FOREIGN PATENT DOCUMENTS 58-14332 1/1983 Japan .

Primary Examiner—Donald McElheny, Jr.
Attorney, Agent, or Firm—Lewis H. Eslinger

[57] ABSTRACT

The present invention is, in an optical head tracking error detecting apparatus in which a laser beam from a semiconductor laser element (1) is introduced into a diffraction grating (3), a 0-order beam and ±1st-order beams emitted from the diffraction grating (3) are introduced through a beam splitter (4) to an objective lens (5), a 0-order beam and ±1st-order beams of converged beams which are introduced into an optical recording medium (6) and reflected on the optical recording medium (6) are passed through the objective lens (5), reflected on the reflection surface of the beam splitter (4), and then introduced into a photodetector (7), a pair of photo-detection outputs corresponding to said ±1st order beams are obtained from the photodetector (7) and on the basis of the difference between the pair of photo-detection outputs, there is generated a tracking error signal corresponding to the tracking state of the 0-order beam on the optical recording medium (6), to provide a pair of positive lenses (9) and (10) between the semiconductor laser element (1) and the diffraction grating (3) and a light shielding member (11) between the pair of positive lenses (9) and (10) to pass therethrough a central beam of the central beam and both side beams which are reflected on the optical recording medium (6), passed through the objective lens (5), the beam splitter (4) and the diffration grating (3) and directed to the semiconductor laser element (1) but to shield the both side beams, whereby to generate a tracking error signal which is not changed by the change of a tangential skew angle of the 0-order beam of an optical head OH relative to the optical recording medium (6).

1 Claim, 3 Drawing Sheets

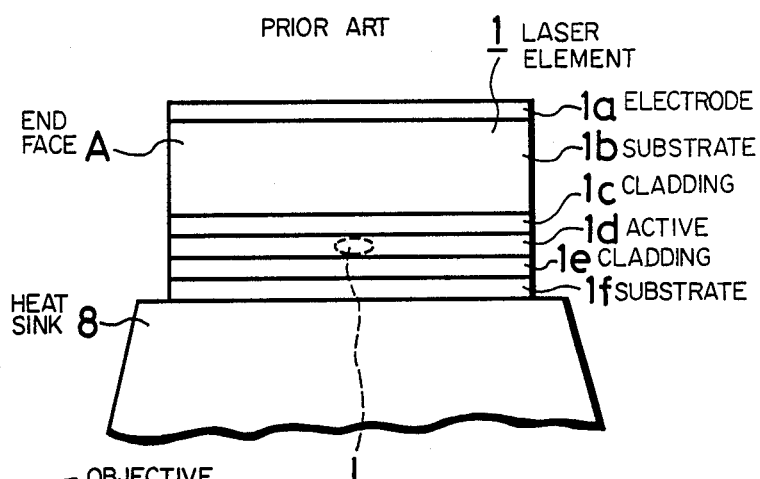
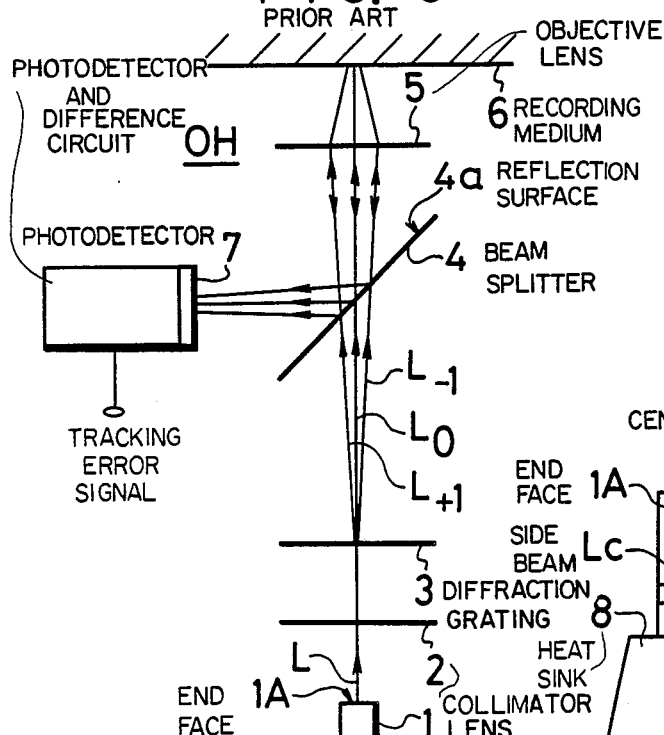
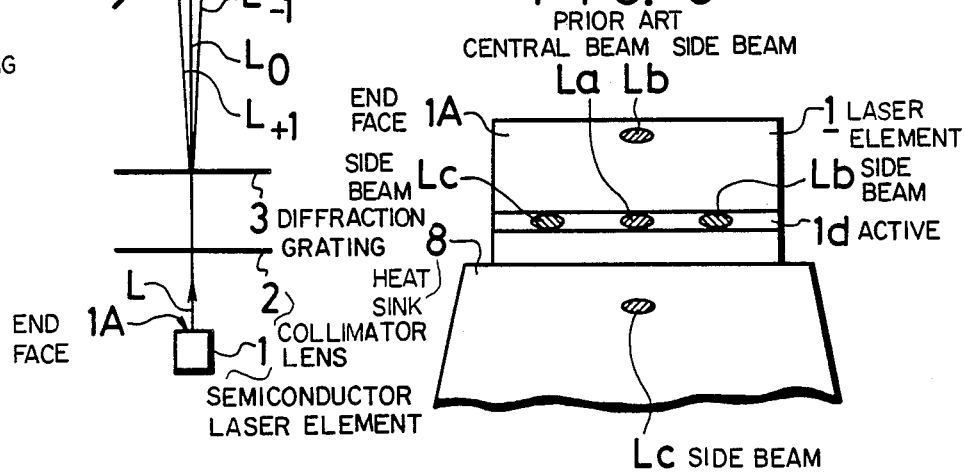

4,766,585

TRACKING ERROR DETECTING APPARATUS FOR OPTICAL HEAD

TECHNICAL FIELD

The present invention relates to an optical head tracking error detecting apparatus suitable for use with optical recording apparatus, reproducing apparatus and recording and reproducing apparatus.

BACKGROUND ART

A prior art optical head tracking error detecting apparatus will be described with reference to FIG. 3. Reference letter OH generally designates an optical head. Reference numeral 1 designates a semiconductor laser element (laser diode). A diverging laser beam L having a cross section of ellipse-shape and emitted from the side of a laser beam emission end face 1A of the semiconductor laser element is introduced into a collimator lens (not always necessary) 2 in which it is collimated as a parallel beam and then made incident on a diffraction grating (grating) 3. A 0-order beam $L_0$ and ±1st-order beams $L_{+1}$ and $L_{-1}$ (beams of higher than +2nd-order and lower than −2nd-order will be neglected) are passed through a non-polarizing beam splitter 4 (half mirror) (if a polarizing beam splitter is used, a ¼ wavelength plate is provided between the same and an objective lens 5) and then introduced into the objective lens 5 in which they are converged. The 0-order beam $L_0$ and ±1st-order beams $L_{+1}$ and $L_{-1}$ converged are made incident on the recording surface of an optical recording medium (including a photo-magnetic recording medium) 6 with a predetermined spacing (e.g., 10 $\mu m$).

The 0-order beam $L_0$ and ±1st-order beams $L_{+1}$ and $L_{-1}$ reflected on the optical recording medium 6 are passed through the objective lens 5 and then made incident on the beam splitter 4. Parts of them are reflected on a reflection surface 4a of the beam splitter and introduced into a photodetector 7. This photodetector 7 is formed of three photodetecting sections into which the 0-order beam $L_0$ and the ±1st-order beams $L_{+1}$ and $L_{-1}$ are introduced respectively. When a difference between the photodetection outputs from the pair of photodetecting sections on which the ±1st-order beams are respectively made incident is calculated, it is possible to obtain a tracking error signal corresponding to the tracking state of the 0-order beam $L_0$ on the recording surface of the optical recording medium 6. Further, a reproduced signal, a focussing error signal and the like are obtained from the photodetecting section into which the 0-order beam is introduced.

Next, an example of the semiconductor laser element 1 will be described with reference to FIG. 4. This semiconductor laser element 1 is normally mounted on a heat sink 8 made of copper and the like which serves as one electrode. The structure of the semiconductor laser element 1 will be described in accordance with the sequential order from the upper layer to the lower layer in the drawing. Reference numeral 1a designates an electrode layer, 1b an n-GaAs layer (substrate layer), 1c an n-$Ga_{1-y}Al_yAs$ layer (cladding layer), 1d a $Ga_{1-x}Al_xAs$ layer (active layer), 1e a p-$Ga_{1-y}Al_yAs$ layer (cladding layer) and 1f a p-GaAs layer. The above mentioned laser beam L is emitted from the active layer 1d. If the laser beam emission end face (cleavage face) 1A of this semiconductor laser element 1 is taken as a front face, the semiconductor laser element 1 is selected such that its width is in a range from 100 to 300 $\mu m$, the height (thickness) thereof is in a range from 80 to 100 $\mu m$ and the depth thereof is in a range from 200 to 300 $\mu m$. The height of the active layer 1d from the upper surface of the heat sink 8 is several $\mu m$.

By the way, if the tangential skew angle of the 0-order beam $L_0$ relative to the recording surface of the optical recording medium 6 is changed, the tracking error signal is changed cyclically in response thereto so that the accurate tracking error can not be detected.

The present inventors have studied the cause thereof and found out the following fact. The 0-order beam $L_0$ and the ±1st-order beams $L_{+1}$ and $L_{-1}$ reflected on the optical recording medium 6 are not only passed through the objective lens 5 and then reflected on the reflection surface 4a of the beam splitter 4 but also passed through the beam splitter 4 and then introduced into the diffraction grating 3, from which corresponding 0-order beam and ±1st-order beams are respectively generated and introduced through the collimator lens 2 to the semiconductor laser element 1. The beam amount of the beam to be directed to the semiconductor laser element 1 is large when the non-polarizing beam splitter is employed; while it is small when the polarizing beam splitter is employed. In this case, as shown in FIG. 5, in accordance with the relative rotational angle between the laser beam emission end face 1A of the semiconductor laser element 1 and the diffraction grating 3, the locations of a central beam La and both side beams Lb and Lc at the both sides of the former, each being introduced into the semiconductor laser element 1, are changed as follows: the central beam La is positioned at the active layer 1d on the laser beam emission end face 1A and the both side beams Lb and Lc are positioned up and down on a straight line perpendicular to the active layer 1d passing through the position of the central beam La; the central beam La and the both side beams Lb and Lc are all positioned on the active layer 1d; and the straight line connecting the central beam La and the both side beams Lb and Lc is placed at an arbitrary anglular position between the above mentioned two cases. These central beam La and both side beams Lb and Lc are such ones that the 0-order beam $L_0$ and the ±1st-order beams $L_{+1}$ and $L_{-1}$ in FIG. 3 are diffracted again by the diffraction grating 3 and then mixed in the superposed state.

By the way, when at least one of the both side beams Lb and Lc is made incident on the surface of the heat sink 8, such surface is a coarse surface so that the incident beam is reflected irregularly, thus causing no trouble. However, when at least one of the both side beams Lb and Lc becomes incident on the laser beam emission end face 1A of the semiconductor laser element 1, this end face 1A has a good reflectivity (e.g., 10%) so that the incident beam is reflected, travelled through the above mentioned optical path and then introduced into the photodetector 7. Thus, the incident beam causes an interference with the +1st-order beam or −1st-order beam. Consequently, in response to the tangential skew angle of the 0-order beam $L_0$ relative to the recording surface of the optical recording medium 6, the intensity of the +1st-order beam or −1st-order beam which is made incident on the photodetector 7 is changed and the tracking error signal is changed cyclically in accordance with the skew angle.

FIG. 6 shows the cyclical property of the level change of the tracking error signal Se in response to the tangential skew angle $\alpha°$ of the 0-order beam $L_0$ relative to the recording surface of the optical recording medium 6 when one beam Lb of the both side beams Lb and Lc is introduced into the laser beam emission end face 1A of the semiconductor laser element 1, while the other beam Lc is introduced into the heat sink 8. In practice, as $|\alpha|$ is increased, the level of the tracking error signal Se is attenuated. When the both side beams Lb and Lc are all incident on the laser beam emission end face 1A, the amplitude of the waveform corresponding to FIG. 6 becomes twice that in FIG. 6 and the phase thereof becomes different from that in FIG. 6.

Next, with reference to FIG. 7 (lens system is not shown), an explanation will be given on an interference arising from a case in which one beam Lb of the both side beams Lb and Lc is introduced into the laser beam emission end face 1A of the semiconductor laser element 1, while the other beam Lc is made incident on the heat sink 8. In FIG. 7, a solid line 1A designates the laser beam emission end face which is generally skewed relative to a broken line emission end face 1A placed at the normal position. A solid line optical recoding medium 6 is inclined relative to a broken line optical recording medium 6 that is placed at the normal position. The 0-order beam $L_0$ is vertical to the laser beam emission end face 1A placed at the normal position and the recording surface of the optical recording medium 6 placed at the normal position. $\theta$ is an angle of the +1st-order beam $L_{+1}$ relative to the 0-order beam $L_0$. $l_1$ designates an optical length between the laser beam emission end face 1A and the diffraction grating 3 and $l_2$ an optical path length between the diffraction grating 3 and the recording surface of the optical recording medium 6. $\Delta l_1$ and $\Delta l_2$ designate optical path differences of the 0-order beam $L_0$ and +1st-order beam $L_{+1}$ relative to the optical path lengths $l_1$ and $l_2$, respectively. $\Delta l_3$ and $\Delta l_4$ respectively designate optical path differences brought about by the skew of the optical recording medium 6 and by the skew of the laser beam emission end face 1A.

Further, g designates a phase difference between the 0-order beam $L_0$ and +1st-order beam $L_{+1}$ in the diffraction grating 3. $i_0$ and $i_1$ designate transmissivities of the 0-order beam $L_0$ and +1st-order beam $L_{+1}$ in the diffraction grating 3, respectively, t a transmissivity of the half mirror 4, and r and f reflectivities on the recording surface of the optical recording medium 6 and on the laser beam emission end face 1A, respectively.

Now, let us think up the complex amplitude of light at a point A on the recording surface of the optical recording medium 6 at which the +1st-order beam $L_{+1}$ becomes incident thereon in the following 4 cases.

(1) $a_1$: the +1st-order beam $L_{+1}$ is directly introduced at the point A.

(2) $a_2$: the 0-order beam, which is obtained by such a manner that the 0-order beam $L_0$ is reflected on the optical recording medium 6 and introduced again to the diffraction grating 3, is reflected on the laser beam emission end face 1A and introduced again to the diffraction grating 3 and thereby produced as a +1st-order beam. This final beam is incident at the point A.

(3) $a_3$: the +1st-order beam, which is provided by such a manner that the 0-order beam $L_0$ is reflected on the optical recording medium 6 and again introduced to the diffraction grating 3, is reflected on the laser beam emission end face 1A and again introduced to the diffraction grating 3 and thereby produced as a 0-order beam. This last beam is made incident at the point A.

(4) $a_4$: the 0-order beam, which is provided by such a manner that the +1st-order beam $L_{+1}$ is reflected on the optical recording medium 6 and then introduced again to the diffraction grating 3, is reflected on the laser beam emission end face 1A and again introduced to the diffraction grating 3 and thereby produced as the 0-order beam. This last beam is made incident at the point A.

Next, $a_1$ to $a_4$ are expressed by the following equations.

$$a_1 = i_1 t \cdot exp\{j(l_1 + g + l_2 + \Delta l_2) + \Delta l_3)\} \quad (1)$$

$$a_2 = i_0^2 i_1 t^3 rf \cdot exp[j\{3(l_1 + l_2) + g + \Delta l_2 + \Delta l_3\}] \quad (2)$$

$$a_3 = i_0^2 i_1 t^3 rf \cdot exp\ [j\{3(l_1 + l_2) + g + 2\Delta l_1 + \Delta l_2 + \Delta l_3 + 2\Delta l_4\}] \quad (3)$$

$$a_4 = i_0^2 i_1 t^3 rf \cdot exp[j\{3(l_1 + l_2) + g + 3(\Delta l_2 + \Delta l_3) + 2\Delta l_1 + 2\Delta l_4\}] \quad (4)$$

To simplify the calculation, if the coherence length of the laser beams is given as less than $2(l_1 + l_2)$, intensity $I_A$ of light at the point A is expressed by the following equation.

$$I_A = |a_i|^2 + |a_2 + a_3 + a_4|^2 = i_2 t^2 [1 + i_0^4 t^4 r^2 f^2 \{3 + 2\cos 2\ (\Delta l_1 + \Delta l_4) + 2\cos 2\ (\Delta l_1 + \Delta l_4 + \Delta l_2 + \Delta l_3) + 2\cos 2\ (\Delta l_2 + \Delta l_3)\}] \quad (5)$$

Further, when both the side beams Lb and Lc are all introduced on the laser beam emission end face 1A, if the +1st-order beam $L_{+1}$ is made incident at the point A on the recording surface of the optical recording medium 6 while the −1st-order beam $L_{-1}$ is made incident at a point B that is symmetrical with respect to the 0-order beam $L_0$, the light intensity $I_A$ at the point A is expressed exactly the same as that in the Eq. (5), while the light intensity $I_B$ at the point B is expressed by the following equation.

$$I_B = i_{12} t^2 [1 + i_{04} t^4 r^2 f^4 \{3 + 2\cos 2\ (\Delta l_1 - \Delta l_4) + 2\cos 2\ (\Delta l_1 - \Delta l_4 + \Delta l_2 - \Delta l_3) + 2\cos 2\ (\Delta l_2 - \Delta l_3)\}] \quad (6)$$

In view of the above aspect, the present invention is to propose the above mentioned optical tracking error detecting apparatus which can produce a tracking error signal that is not changed at all by the change of the tangential skew angle of the 0-order beam of the optical head relative to the optical recording medium.

DISCLOSURE OF THE INVENTION

An optical head tracking error detecting apparatus of this invention comprising a semiconductor laser element, a diffraction grating to which laser beam from the semiconductor laser element is introduced, a beam splitter through which a 0-order beam and ±1st-order beams emitted from the diffraction grating are passed, an objective lens for converging the 0-order beam and the ±1st-order beams from the beam splitter so as to introduce the same on an optical recording medium and a photodetector to which a 0-order beam and ±1st-order beams reflected on the optical recording medium, passed through the objective lens and then reflected on a reflection surface of the beam splitter are introduced wherein a pair of photo-detection outputs corresponding to the ±1st-order beams are obtained from the photodetector and on the basis of the difference between the pair of photo-detection outputs, there is generated a tracking error signal corresponding to the tracking state of the 0-order beam on the optical recording medium, which is characterized in that a pair of positive lenses are provided between the semiconductor laser element and the diffraction grating and a light shielding member is provided between the pair of positive lenses to pass therethrough a central beam of the central beam and both side beams thereof which are all reflected on the optical recording medium, passed through the objective lens, the beam splitter and the diffraction grating and directed to the semiconductor laser element but to shield both side beams.

BRIEF DESCRIPTION OF DRAWINGS

FIG. 3 is a schematic locational diagram showing a prior art optical head tracking error detecting apparatus, FIGS. 4 and 5 are front views showing one example of a semiconductor laser element used in the conventional optical head tracking error detecting apparatus.

BEST MODE FOR CARRYING OUT THE INVENTION

Figure 1A:
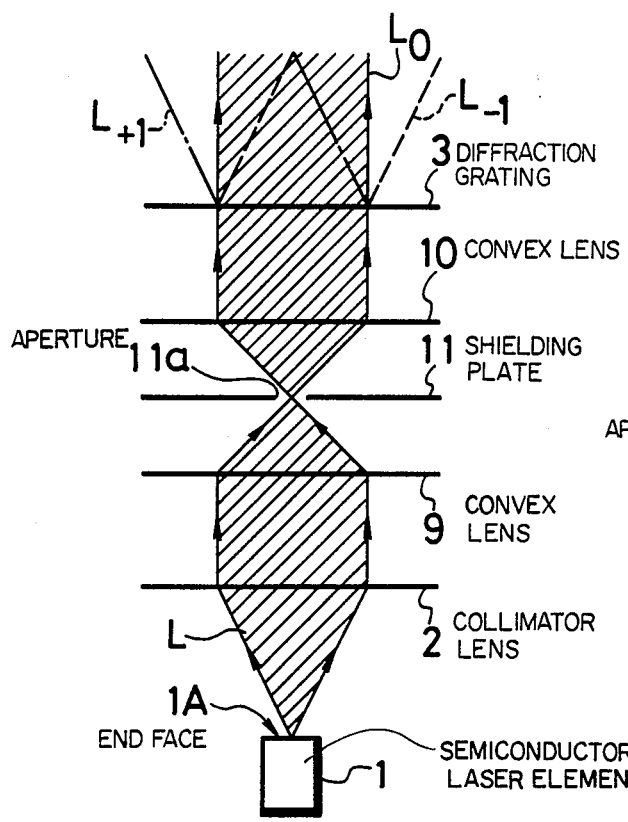
FIGS. 1A and 1B and FIG. 2 are locational representations showing an embodiment of a main part of an optical head tracking error detecting apparatus according to the present invention and a waveform diagram useful for the explanation thereof.
Figure 1B:
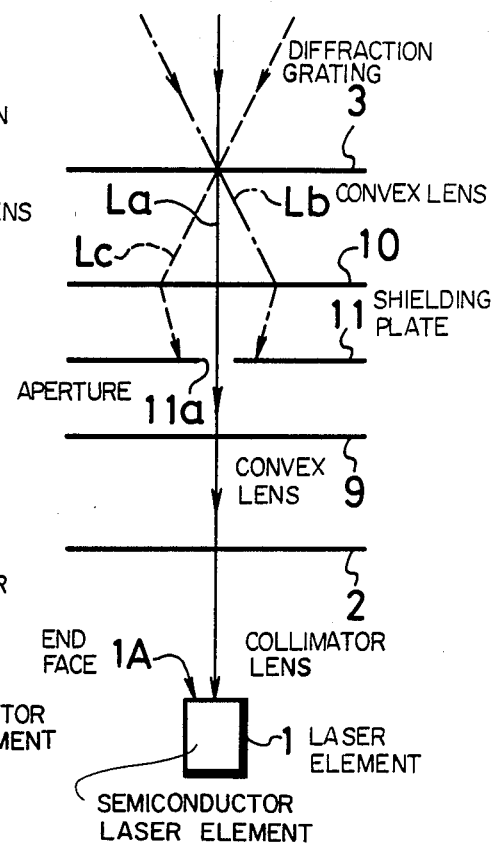

One embodiment of the present invention will hereinafter be described with reference to FIGS. 1A and 1B. In FIGS. 1A and 1B, like parts corresponding to those of FIGS. 3 to 7 are marked with the same references and the overlapping explanation thereof will be omitted. Between the collimator lens 2 and the diffraction grating 3, there are provided a pair of positive lenses (convex lenses) 9 and 10 and a light shielding plate (light shielding member) 11 that is located between the pair of positive lenses 9 and 10 to pass therethrough the central beam La of the central beam 1a and the both side beams Lb and Lc thereof which are all reflected on the optical recording medium 6, passed through the objective lens 5, the beam splitter 4, the diffraction grating 3 and then directed to the semiconductor laser element 1 but to shield both side beams Lb and Lc.

As the lenses 9 and 10, such one is desirable which has less aberration, a large effective aperture and a long focal length. For example, the focal length is 17 mm and NA is 0.14. A central aperture 11a of the light shielding plate 11 is 60 μm in diameter (or width) and 10 μm in thickness. The wavelength of the laser beam L is 830 nm. Further, the spacing between the beams is 75 μm and the beam spot size on the recording medium 6 is 7 μm.

Then, as shown in FIG. 1A, the diverging laser beam emitted from the semiconductor laser element 1 is collimated by the collimator lens 2 as the parallel beam and introduced into the lens 9 by which it is converged. The converged beam is further introduced into the lens 10 by which it is collimated again as the parallel beam and then introduced into the diffraction grating 3. The light shielding plate 11 is located near the converging point of the converged beam that is passed through the lens 9. Reference numeral 11a designates the central aperture (slit) of the light shielding plate 11 which is used to pass therethrough only the central beam. Other arrangements are made similar to those in FIGS. 3 to 7.

Consequently, as shown in FIG. 1B, of the central beam La and both the side beams Lb and Lc thereof which are all reflected on the recording medium 6, passed through the objective lens 5, the beam splitter 4 and the diffraction grating 3 and directed to the semiconductor laser element 1, the central beam La passes through the central aperture (slit) 11a of the light shielding plate 11, but both side beams Lb and Lc are shielded by the shielding plate 11. The light shielding plate 11 is given a light absorbence property or light diffused reflection property on its surface facing to the diffraction grating 3 side.

Figure 2:
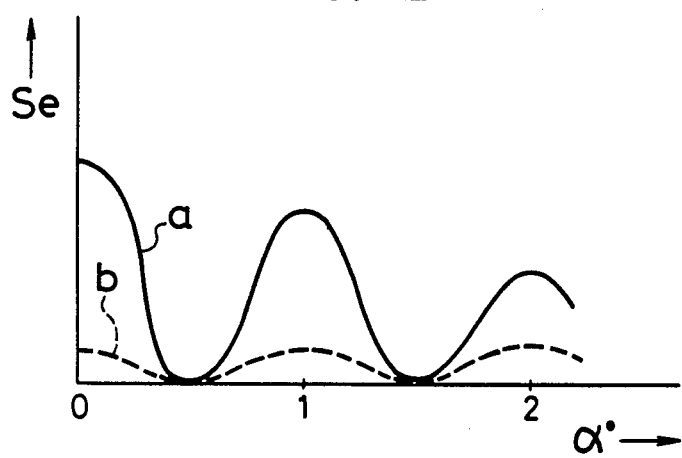
Figure 6:
FIG. 6, is a waveform diagram and, FIG. 7 is a diagram useful for explaining the interference.
Figure 7:
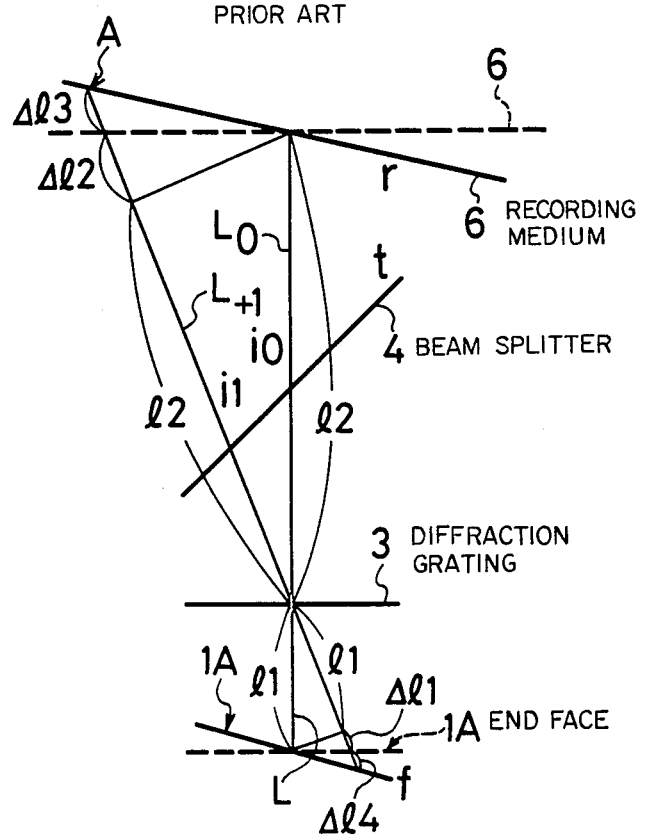

In FIG. 2, curves a and b indicate respectively the level changing characteristics of the tracking error signal Se relative to the tangential skew angle $\alpha°$ corresponding to that in FIG. 6 under the state that the lenses 9 and 10 and the light shielding plate 11 are not provided and under the state that they are provided. The curve b (broken line) becomes considerably small as compared with the curve a (solid line) in the amplitude level.

According to the optical head tracking error detecting apparatus as set forth above, even when the beams reflected on the optical recording medium 6 are directed through the objective lens 5, the beam splitter 4 and the diffraction grating 3 to the semiconductor laser element 1, there is no fear that such beams will be reflected on the laser beam emission end face 1A thereof. Therefore, it is possible to obtain the tracking error signal which is not changed at all by the change of the tangential skew angle of the 0-order beam of the optical head OH relative to the optical recording medium 6.

We claim:

1. An optical head tracking error detecting apparatus comprising a semiconductor laser element, a diffraction grating on which a laser beam from said semiconductor laser element is made incident, a beam splitter passing therethrough a 0-order beam and ±1st-order beams emitted from said diffraction grating, an objective lens for converging a 0-order beam and ±1st-order beams from said beam splitter and for introducing the same on an optical recording medium and a photodetector to which the 0-order beam and ±1st-order beams reflected on said optical recording medium, passed thorugh said objective lens and then reflected on a reflection surface of said beam splitter are introduced, wherein a pair of photo-detection outputs corresponding to said ±1st order beams are obtained from said photodetector, said photodetector having means for generating a tracking error signal corresponding to the tracking state of said 0-order beam on said optical recording medium on the basis of a difference between said pair of photo-detection outputs, said optical head tracking error detecting apparatus being characterized in that a pair of positive lenses are provided between said semiconductor laser element and said diffraction grating and a light shielding member is provided between said pair of positive lenses so as to pass therethrough a central beam of the central beam and both side beams thereof, which are reflected on said optical recording medium, passed through said objective lens, said beams splitter, said diffraction grating and directed to said semiconductor laser element, and to shield said both side beams.

* * * * *

UNITED STATES PATENT AND TRADEMARK OFFICE
CERTIFICATE OF CORRECTION

PATENT NO. : 4,766,585
DATED : August 23, 1988
INVENTOR(S) : Atsushi Fukumoto et al.

It is certified that error appears in the above-identified patent and that said Letters Patent is hereby corrected as shown below:

Column 4, line 44, change "$f^1$" to --$f^2$--.

Column 5, line 33, after "Fig. 6" delete ",".

IN THE CLAIMS

Column 6, line 50, change "thorugh" to --through--.

Signed and Sealed this

Fourteenth Day of March, 1989

*Attest:*

DONALD J. QUIGG

*Attesting Officer*  *Commissioner of Patents and Trademarks*